(12) United States Patent
Reasoner et al.

(10) Patent No.: US 6,557,764 B1
(45) Date of Patent: May 6, 2003

(54) METHOD AND APPARATUS FOR ILLUMINATION CONTROL TO INCREASE THE MANUFACTURING YIELD FOR A BAR CODE AND POSITION REFERENCE READER IN A MASS STORAGE AUTO-CHANGER

(75) Inventors: Kelly J Reasoner, Ft Collins, CO (US); Richard L Gardner, Jr., Greeley, CO (US); Richard A Irwin, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/373,471

(22) Filed: Aug. 12, 1999

(51) Int. Cl.$^7$ .................................................. G06K 7/10
(52) U.S. Cl. ................... 235/455; 235/462.06; 250/205
(58) Field of Search ........................ 235/455, 462.06, 235/462.11, 462.14, 462.17, 462.23, 462.25, 462.41, 462.42; 250/201.1, 205

(56) References Cited

U.S. PATENT DOCUMENTS

| | | | | |
|---|---|---|---|---|
| 4,097,732 A | * | 6/1978 | Krause et al. ............... 250/205 |
| 4,677,287 A | * | 6/1987 | Ejima .......................... 250/205 |
| 4,917,031 A | * | 4/1990 | Itoh ........................ 112/121.11 |
| 4,933,538 A | * | 6/1990 | Heiman et al. ......... 235/462.31 |
| 5,303,214 A | * | 4/1994 | Kulakowski et al. ....... 369/30.3 |
| 5,514,864 A | * | 5/1996 | Mu-Trng et al. ............. 250/205 |
| 5,532,467 A | * | 7/1996 | Roustaei ................. 235/472.01 |
| 5,550,362 A | | 8/1996 | Sherman ...................... 235/455 |
| 5,581,071 A | * | 12/1996 | Chen et al. .................. 235/455 |
| 5,636,040 A | | 6/1997 | Tung .......................... 358/475 |
| 5,679,941 A | * | 10/1997 | Iizaka et al. ................ 235/383 |
| 5,815,200 A | * | 9/1998 | Ju et al. ...................... 348/229 |
| 5,923,020 A | * | 7/1999 | Kurokawa et al. .......... 235/454 |
| 6,095,417 A | * | 8/2000 | Ahlquist et al. ............. 235/454 |
| 6,194,697 B1 | * | 2/2001 | Gardner, Jr. |
| 6,246,642 B1 | * | 6/2001 | Garnder, Jr. et al. .......... 369/36 |
| 6,262,863 B1 | * | 7/2001 | Ostwald et al. ............... 360/92 |

FOREIGN PATENT DOCUMENTS

JP          11-502330        *   7/1999

* cited by examiner

*Primary Examiner*—Diane I. Lee
(74) *Attorney, Agent, or Firm*—Steven L. Webb; David W. Boyd

(57) ABSTRACT

A method and apparatus that allows the adjustment of the intensity of the illumination source in a barcode reader, using the barcode reader as the measuring device, to give a predetermined amount of light from a known target. The adjustment of the intensity of the illumination source in the barcode reader compensates for the manufacturing tolerances of the barcode reader.

1 Claim, 5 Drawing Sheets

METHOD AND APPARATUS FOR ILLUMINATION CONTROL TO INCREASE THE MANUFACTURING YIELD FOR A BAR CODE AND POSITION REFERENCE READER IN A MASS STORAGE AUTO-CHANGER

FIELD OF THE INVENTION

The present invention relates generally to illumination control and more specifically to increasing the manufacturing yield in an optical system used for reading bar codes and position reference marks, by adjusting the intensity of the illumination source with pulse width modulation (PWM).

BACKGROUND OF THE INVENTION

Jukebox storage devices (also called mass storage auto-changers) typically contain a number of data cartridges. These data cartridges are typically stored in cartridge magazines. The magazines typically contain a number of slots or spaces where the data cartridges can be stored. The jukebox may contain a plurality of magazines. Typically the magazines are removable from the jukebox storage device for easier access to the magazines so the magazines can be loaded with data cartridges. Typically each data cartridge is labeled such that the jukebox storage device can identify and keep track of the location of each data cartridge. Typically the data cartridge is labeled with a barcode and the jukebox storage device contains an optical system that can read bar codes. The optical system is typically referred to as a barcode reader, however the optical system typically is used for tasks in addition to reading barcodes. For example the jukebox storage device also needs to be able to determine if a magazine is loaded into the jukebox and if a slot or space in the magazine contains a data cartridge. Typically the magazines are labeled such that the jukebox storage device can use the barcode reader to detect if a magazine is present. The barcode reader can also be used to determine the location of the magazine. The jukebox storage device also typically uses the barcode reader to determine if a slot or space in the magazine contains a data cartridge. Because the barcode reader in the jukebox storage device is used for a number of different tasks (i.e. cartridge detection, magazine detection, magazine location, and cartridge identification) the intensity of light detected by the barcode reader from a given target needs to be well defined.

Typically the barcode reader (see FIG. 1) contained within a jukebox storage device uses a charged coupled device (CCD) (102) to measure the reflected light, a light emitting diode (LED) (110) as the illumination source and two lenses, one lens (108) to focus the light from the LED (110) onto the target (106) and one lens (104) to focus the reflected light from the target (106) onto the CCD (102). Each of the elements of the barcode reader typically has some manufacturing tolerance that creates differences in the performance of the total barcode reader. For example two LED's created by the same manufacturing process typically have a different light output for the same electrical input. Alignment of the LED to its focusing lens and the alignment of the CCD to its focusing lens can also affect the amount of light detected by the CCD for a given target. Because of the differences in the individual part tolerances and the alignment tolerances of the optical system the total variation of light detected at the CCD for a given target between two different barcode readers can be as large as 50%. This large variation in light detected between two different barcode readers makes it difficult for barcode readers to be able to fulfill all of the required tasks. For example, FIG. 2 shows a typical target used to determine the presence of a magazine in a jukebox storage device. FIG. 3 shows the intensity of the detected light (302) from the target as the barcode reader sweeps across the target. Typically the intensity of the detected light (302) must start above and then fall below a threshold (304) before the jukebox storage device considers that a target has been successfully detected. FIG. 4 shows the intensity of the detected light from a target when the light that makes it through the system is too low (404) and when the light that makes it through the system is too high (402). When the light that makes it through the system is too high (402) the intensity never falls below the threshold (406) and no target is detected. When the light that makes it through the system is too low (404) the intensity never gets above the threshold (406) and no target is detected.

One way to overcome this variation in barcode readers is to measure the light detected by the barcode readers with a given target and keep the barcode readers that meet a narrow tolerance of detected light. Because the required tolerance on the measured reflected light is small and the variation in the measured reflected light is large, the yield of usable barcode readers is small.

There is a need for an improvement in the yield of optical systems used as barcode readers in jukebox storage devices.

SUMMARY OF THE INVENTION

A method and apparatus that allows the adjustment of the intensity of the illumination source in a barcode reader, using the barcode reader as the measuring device, to give a predetermined amount of light from a known target. The adjustment of the intensity of the illumination source in the barcode reader compensates for the manufacturing tolerances of the barcode reader.

DETAILED DESCRIPTION OF THE PREFERRED EMBODIMENT

Figure 1:
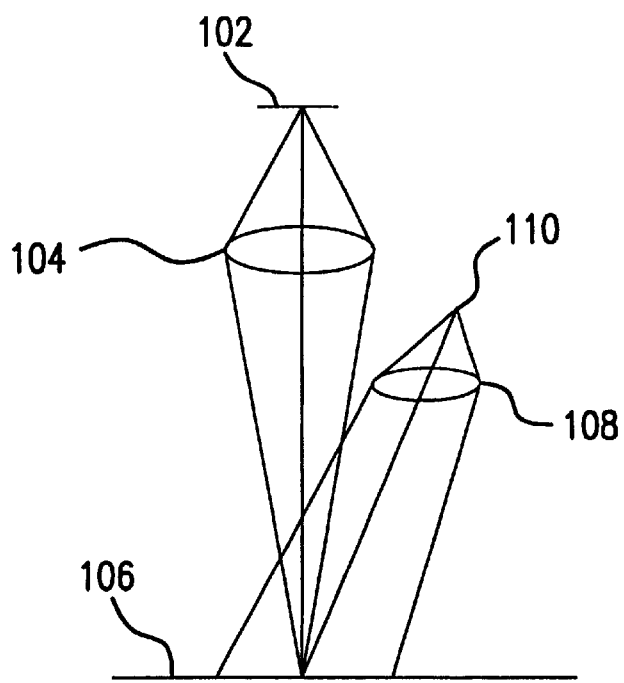
FIG. 1 is the optical layout of a barcode reader with a target.
Figure 2:
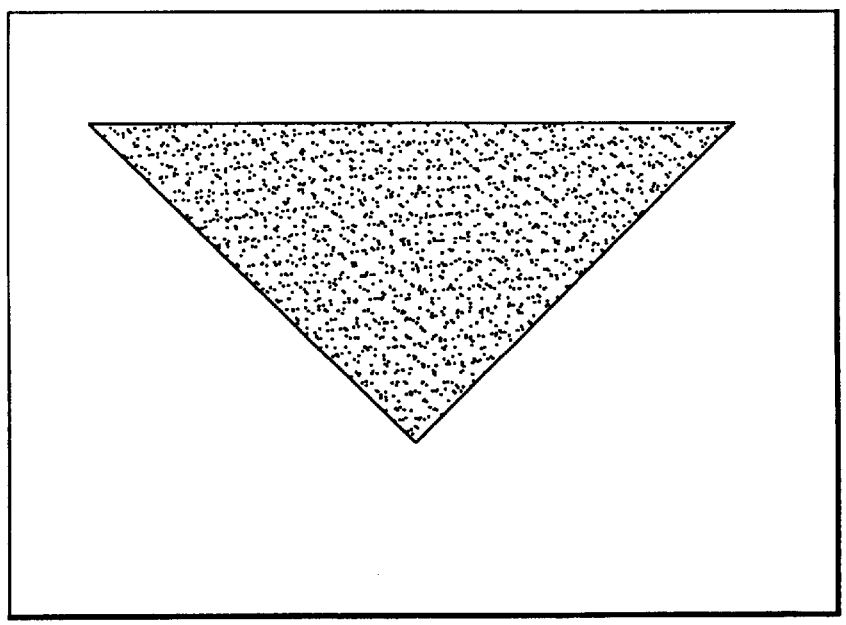
FIG. 2 is a drawing of a target used to determine the presence of a magazine in a jukebox storage device.
Figure 3:
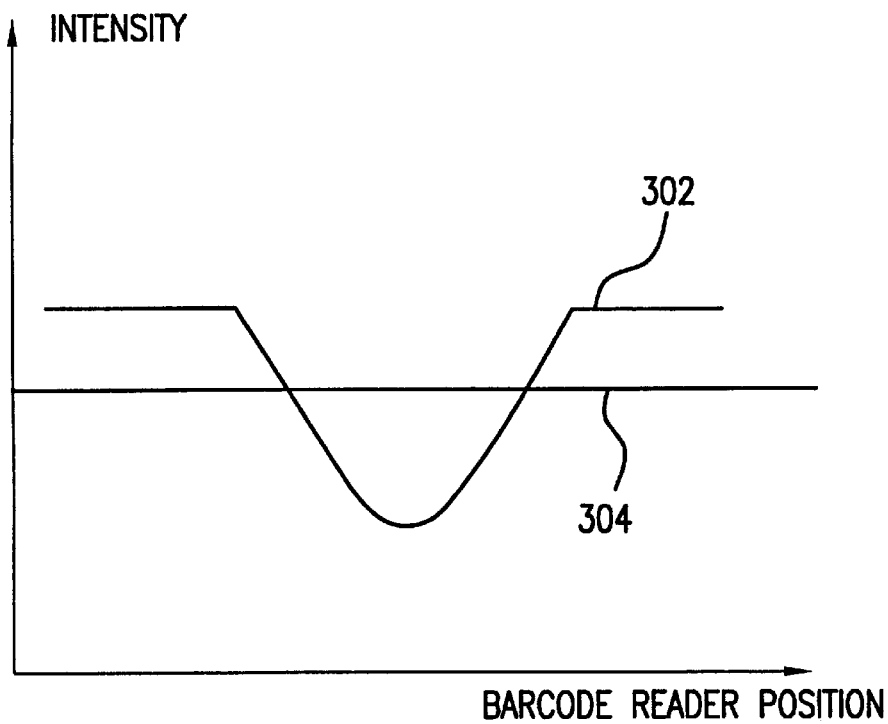
FIG. 3 is a graph of the light detected by a barcode reader vs. the position of the barcode reader with respect to a presence target.
Figure 4:
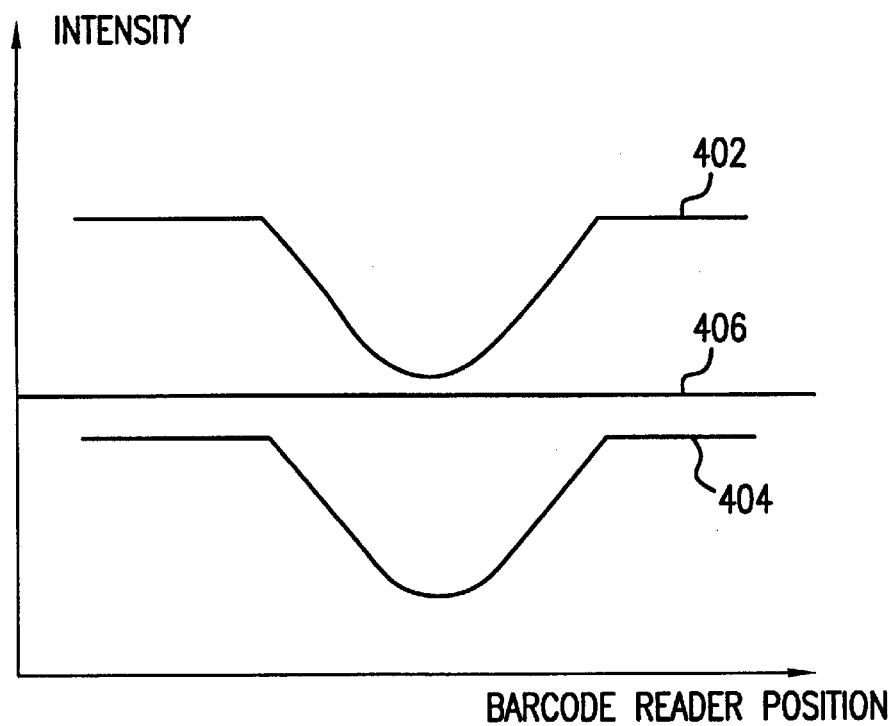
FIG. 4 is a graph of the light detected by a barcode reader vs. the position of the barcode reader with respect to a presence target when the barcode reader does not have the correct amount of reflected light being detected.

By adjusting the illumination intensity of an optical system to give a predetermined level of detected intensity through the optical system with a given target at a predetermined location with respect to the optical system, the manufacturing yield of the optical system can be increased. This method will compensate for the manufacturing tolerances of the individual parts and the degradation due to misalignment of the optical system. Some of the manufacturing tolerances that are compensated are: 1) the variation in intensity between different LED's 2) the variation in the transmission of light between different LED focus lenses 3) the variation in focal length between different LED focus lenses 4) the variation in transmission of light between different CCD focus lenses 5) the variation in focal lengths between different CCD focus lenses 6) and the variation in responsiveness between different CCD's. Some of the degradation in intensity due to alignment variations that are compensated are: 1) the alignment between the LED and the LED focus lens 2) the alignment of the LED to the CCD 3) and the alignment between the CCD focusing lens and the CCD.

In one embodiment of the present invention the optical system comprises an illumination source, typically an LED, a light detection device, typically a CCD, and two lenses. The first lens is used to focus the light from the LED to the viewing area of the CCD. The second lens is used to focus the light from the viewing area onto the CCD. The optical system is built as a subassembly that can be attached to the jukebox storage device after calibration. The optical system subassembly has reference mounting surfaces used to align the optical system subassembly with respect to the jukebox storage device. The optical system subassembly calibration fixture (calibration fixture) uses the reference mounting surfaces to mount and align the optical system subassembly in the calibration fixture.

Figure 5:
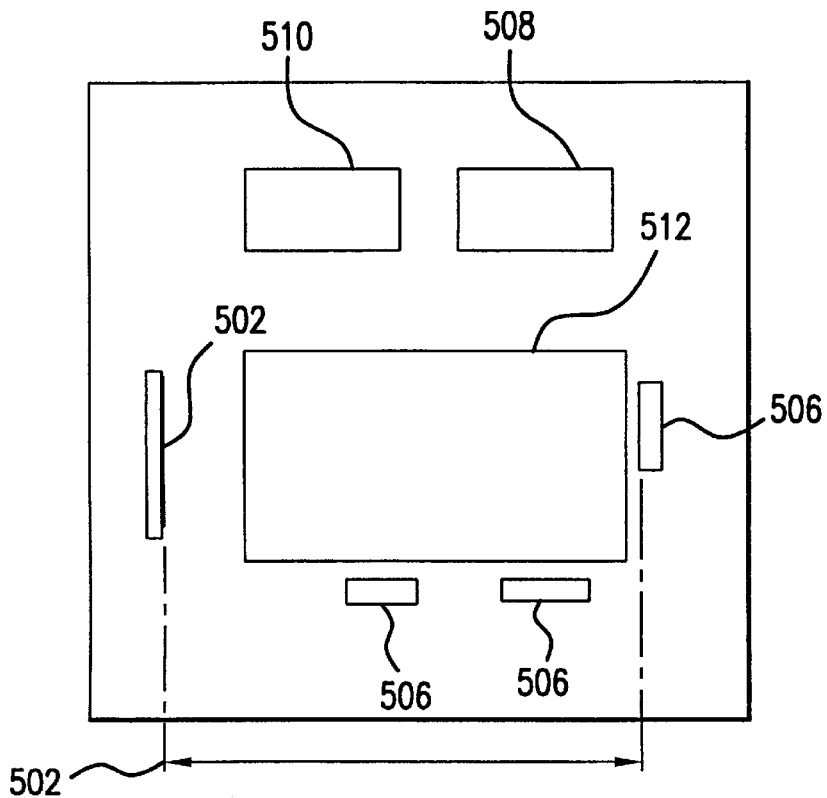
FIG. 5 is a block diagram of the calibration fixture in accordance with the present invention.

The calibration fixture has a target (502) that is positioned at a distance (504) from the mounting surfaces (506) that corresponds to the nominal distance that the magazine location targets and the cartridge ID targets will be located at in the jukebox storage device. FIG. 5 shows a simple embodiment of the mounting surfaces for clarity, as one skilled in the art would realize there are many different configurations for mounting surfaces. The calibration fixture also contains the electronics required to read the intensity of the light hitting the CCD (508) and the electronics required to drive the LED (510), in the optical system subassembly (512), at different intensity levels.

Figure 6:
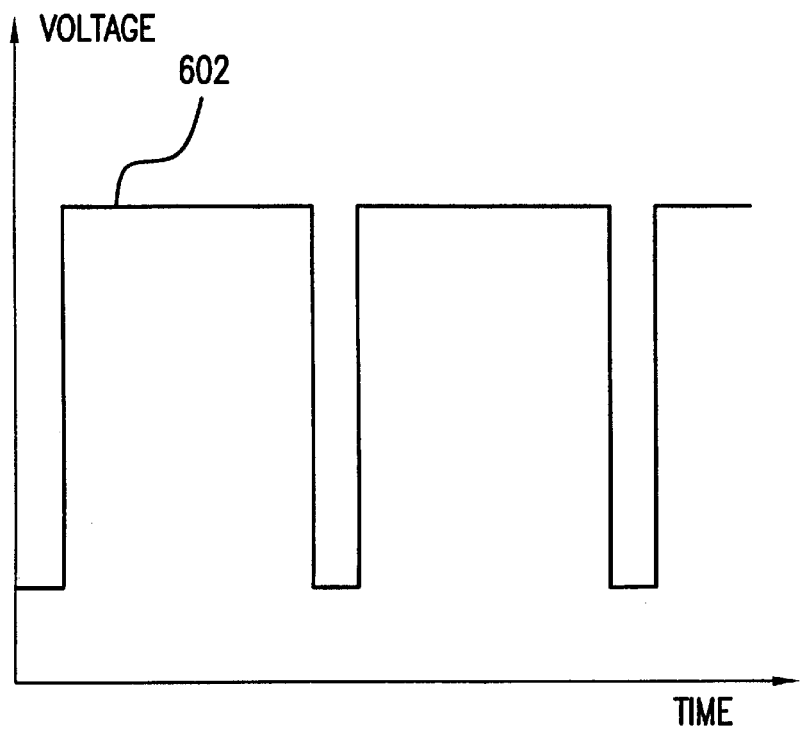
FIG. 6 is a graph of a pulse width modulation of 90%.
Figure 7:
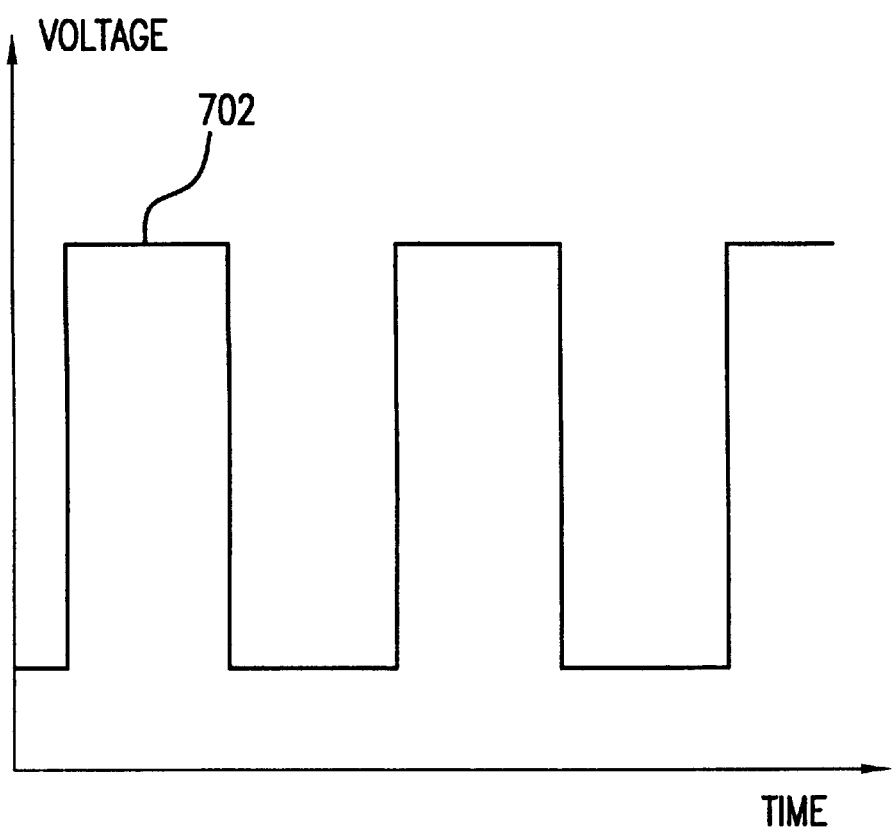
FIG. 7 is a graph of a pulse width modulation of 50%.
Figure 8:
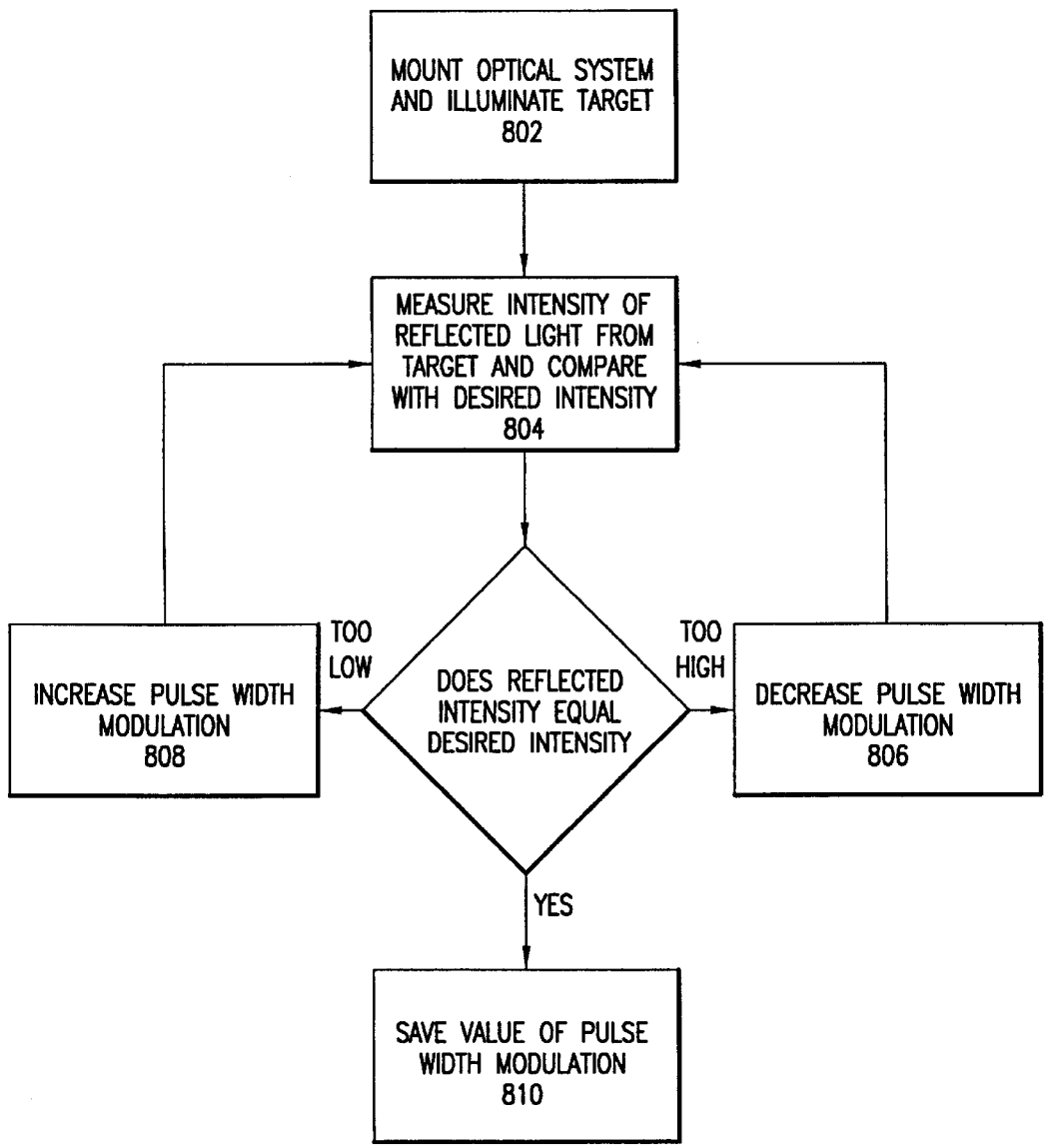
FIG. 8 is a flow chart of the pulse width modulation calibration method in accordance with the present invention.

The LED intensity can be controlled by pulse width modulation of the driving voltage. The voltage drives a voltage to current converter that produces a constant current that is proportional to the pulse duty cycle of the input voltage. Pulse width modulation changes the intensity of the LED by changing the percent of time that the voltage driving the current converter is at a high value. For example, for high light intensity the pulse width (602) of the high voltage driving the current converter is at 90% (see FIG. 6). For a medium light intensity, the pulse width (702), or percent of high voltage time, can be set to 50% (see FIG. 7). For a low light intensity, the pulse width of the driving voltage can be set to 10% (not shown). In one embodiment of the present invention there are 128 different levels that the pulse width can be set at corresponding to 128 different intensity level for the LED. As one skilled in the art would know, the number of levels of pulse width modulation can be increased or decreased depending on the minimum change in light required.

For calibration the optical system subassembly is mounted into the calibration fixture, using the mounting surfaces, and the LED is turned on at a set pulse width (802).

The intensity of the light detected by the CCD is measured and compared with the desired intensity (804). If the intensity of light is higher than the desired intensity the pulse width modulation is reduced (806). If the intensity of light is lower than the desired intensity the pulse width modulation is increased (808). If the intensity of light matches the desired intensity, within some tolerance range, the value of the pulse width modulation is stored (810) for later use by the jukebox storage device. When the optical system subassembly is mounted into a jukebox storage device, the correct pulse width modulation for that optical subassembly is communicated to the jukebox storage device such that when the jukebox storage device uses the optical system subassembly the jukebox storage device drives the LED using the stored pulse width modulation value that was determined by the calibration fixture. By using the pulse width modulation value from the calibration fixture all of the variation in the manufacturing tolerances of the components in the optical system subassembly have been eliminated. The variation in intensity detected by the CCD due to variations of alignment of the optical system subassembly have also been eliminated. Therefore the manufacturing yield of the optical system subassembly has been increased.

The foregoing description of the present invention has been presented for purposes of illustration and description. It is not intended to be exhaustive or to limit the invention to the precise form disclosed, and other modifications and variations may be possible in light of the above teachings. For example, the calibration fixture could set the intensity of the LED to each of the 128 values and then measure the intensity of light detected by the optical system. The selection of the correct LED driving value for the desired detected intensity could be done as a separate step. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of compensating for manufacturing tolerances in an optical system used in a mass storage autochanger, comprising:

placing a target, the target having a reflectance, at a known position with respect to the optical system;

illuminating the target with an illumination source of the optical system;

measuring an amount of light detected by the optical system that was reflected from the target;

adjusting an output of the illumination source, using the measured detected light, to give a known amount of detected light;

storing, for later use, an output value of the illumination source that gives a known amount of detected light for the optical system; and transferring the optical system and the stored output value of the illumination source to a product being assembled for assembly into said product.

* * * * *